United States Patent
Bhat Noojady et al.

(10) Patent No.: US 10,462,269 B2
(45) Date of Patent: Oct. 29, 2019

(54) PACKETIZING ENCODED AUDIO FRAMES INTO COMPRESSED-OVER-PULSE CODE MODULATION (PCM) (COP) PACKETS FOR TRANSMISSION OVER PCM INTERFACES

(71) Applicant: QUALCOMM Incorporated, San Diego, CA (US)

(72) Inventors: Raghavendra Bhat Noojady Krishna, San Diego, CA (US); Anssi Haverinen, San Diego, CA (US); Siva Pavan Kumar Mitnala, San Diego, CA (US); Jitendra Prasad, San Diego, CA (US); Bijan Timsari, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 61 days.

(21) Appl. No.: 15/660,044

(22) Filed: Jul. 26, 2017

(65) Prior Publication Data

US 2018/0048744 A1 Feb. 15, 2018

Related U.S. Application Data

(60) Provisional application No. 62/374,991, filed on Aug. 15, 2016.

(51) Int. Cl.
*H04L 29/08* (2006.01)
*H04L 12/10* (2006.01)
(Continued)

(52) U.S. Cl.
CPC .......... *H04L 69/324* (2013.01); *G10L 19/167* (2013.01); *H04B 14/04* (2013.01); *H04L 12/10* (2013.01)

(58) Field of Classification Search
None
See application file for complete search history.

(56) References Cited

U.S. PATENT DOCUMENTS 6,598,172 B1    7/2003  VanDeusen et al.
6,904,403 B1*   6/2005  Muraki ............ H04L 12/40058
                                                    704/212
(Continued)

FOREIGN PATENT DOCUMENTS

WO    2008001254 A1    1/2008

OTHER PUBLICATIONS

Second Written Opinion for PCT/US2017/044064, dated Jul. 2, 2018, 6 pages.
(Continued)

*Primary Examiner* — Michael J Moore, Jr.
(74) *Attorney, Agent, or Firm* — Withrow & Terranova, PLLC (57) ABSTRACT

Aspects disclosed in the detailed description include packetizing encoded audio frames into compressed-over-pulse code modulation (PCM) (COP) packets for transmission over PCM interfaces. In one aspect, a COP packetizing circuit is configured to receive an encoded audio frame generated from a PCM frame, and generate a COP packet that includes the encoded audio frame irrespective of the audio format. The COP packet is generated with a packet length proportional to a PCM length of the PCM frame, allowing the COP packetizing circuit to transmit the COP packet over an isochronous PCM interface with a lower bit rate than the PCM frame to reduce power. The COP packetizing circuit provides a mobile computing device with a single packetizing scheme that supports multiple audio formats, and allows for reducing power through bit rate scaling.

15 Claims, 8 Drawing Sheets

(51) Int. Cl.
*H04B 14/04* (2006.01)
*G10L 19/16* (2013.01)

(56) References Cited

U.S. PATENT DOCUMENTS

| | | | |
|---|---|---|---|
| 6,931,291 B1* | 8/2005 | Alvarez-Tinoco | H04S 1/007 381/22 |
| 2004/0062252 A1* | 4/2004 | Dowdal | H04J 3/0632 370/395.62 |
| 2005/0259601 A1* | 11/2005 | Rosenberg | H04L 29/06027 370/260 |
| 2008/0008281 A1 | 1/2008 | Abrol et al. | |
| 2008/0287063 A1* | 11/2008 | Kidron | G10L 19/167 455/41.2 |
| 2010/0042740 A1* | 2/2010 | Bhattacharya | G10L 19/167 709/231 |
| 2010/0091769 A1 | 4/2010 | Magliaro et al. | |
| 2011/0199909 A1* | 8/2011 | Walley | G10L 19/00 370/241 |
| 2015/0264513 A1 | 9/2015 | Ryazanov | |

OTHER PUBLICATIONS

Author Unknown, "Digital audio—Interface for non-linear PCM encoded audio bitstreams applying to IEC 60958—Part 7: Non-linear PCM bitstreams according to the ATRAC, ATRAC2/3 and ATRAC-X formats," Abstract, International Electrotechnical Commission (IEC) International Standard, Nov. 24, 2004, 3 pages, https://webstore.iec.ch/publication/6138&preview=1.

Author Unknown, "S/PDIF," Wikipedia, The Free Encyclopedia, last modified: May 30, 2017, retrieved from: https://en.wikipedia.org/wiki/S/PDIF, 3 pages.

International Search Report and Written Opinion for PCT/US2017/044064, dated Sep. 21, 2017, 13 pages.

International Preliminary Report on Patentability for PCT/US2017/044064, dated Oct. 9, 2018, 21 pages.

* cited by examiner

PACKETIZING ENCODED AUDIO FRAMES INTO COMPRESSED-OVER-PULSE CODE MODULATION (PCM) (COP) PACKETS FOR TRANSMISSION OVER PCM INTERFACES

PRIORITY CLAIM

The present application claims priority under 35 U.S.C. § 119(e) to U.S. Patent Application Ser. No. 62/374,991 filed on Aug. 15, 2016 and entitled "PACKETIZING ENCODED AUDIO FRAMES INTO COMPRESSED-OVER-PULSE CODE MODULATION (PCM) (COP) PACKETS FOR TRANSMISSION OVER PCM INTERFACES," the contents of which is incorporated herein by reference in its entirety.

BACKGROUND

I. Field of the Disclosure

The technology of the disclosure relates generally to packetizing encoded audio data.

II. Background

Mobile computing devices, such as mobile phones and computer tablets, have become increasingly common in contemporary society. The prevalence of these mobile computing devices is driven in part by the many functions that are now enabled on such devices. Increased processing capabilities in such devices means that mobile computing devices have evolved from being pure communication tools into sophisticated mobile multimedia centers that enable enhanced user experiences.

In this regard, mobile computing devices are increasingly capable of providing a variety of multimedia services based on numerous communication protocols. For example, mobile computing devices are often configured to provide audio data associated with applications such as voice communications and real-time streaming media, including music and movies. The data associated with such audio is conventionally encoded (e.g., compressed) and exchanged between integrated circuits within mobile computing devices according to particular protocols. For example, audio transmitted according to the Bluetooth™ protocol may be encoded in corresponding formats such as Low Complexity Subband Coding (SBC), digital audio data reduction technology (aptX), aptX-High Definition (aptX-HD), and advanced audio coding (AAC), and exchanged within a single mobile computing device.

Conventional interfaces used to exchange encoded data within mobile computing devices, such as SLIMBus or any interface defined under the International Electrotechnical Commission (IEC) 61937 international standard, primarily support transmission of pulse code modulation (PCM) data at a constant bit rate or throughput (e.g., isochronous interfaces). Various audio formats do not have a constant bit rate, and thus, cannot be transmitted as-is over interfaces that support PCM data.

SUMMARY OF THE DISCLOSURE

Aspects disclosed in the detailed description include packetizing encoded audio frames into compressed-over-pulse code modulation (PCM) (COP) packets for transmission over PCM interfaces. In one aspect, a COP packetizing circuit is configured to receive an encoded (e.g., compressed) audio frame generated from a PCM frame. The COP packetizing circuit generates a COP packet that includes the encoded audio frame irrespective of the format of the encoded audio frame. The COP packet is generated with a packet length proportional to a PCM length of the PCM frame, which allows the COP packetizing circuit to transmit the COP packet over an isochronous PCM interface with a lower bit rate than the PCM frame to reduce power. Thus, the COP packetizing circuit provides a mobile computing device with a single packetizing scheme that supports multiple audio formats, and also allows for reducing power through bit rate scaling.

In this regard in one aspect, a COP packetizing circuit is provided. The COP packetizing circuit is configured to receive an encoded audio frame generated from a PCM frame having a PCM length. The COP packetizing circuit is further configured to generate a COP packet having a packet length proportional to the PCM length. The COP packet includes a COP header comprising data used by a receiver module to depacketize the COP packet. The COP packet further includes a subframe that includes the encoded audio frame. The subframe also includes a frame length field that indicates a length of the encoded audio frame. The COP packet further includes a zero padding block including a zero padding length field that indicates a number of zero bytes in a zero padding field. The zero padding field includes the number of zero bytes. The COP packetizing circuit is further configured to provide the COP packet to the receiver module over a PCM interface.

In another aspect, a method for packetizing an encoded audio frame based on a PCM frame into a COP packet is provided. The method includes receiving an encoded audio frame generated from a PCM frame having a PCM length. The method further includes generating a COP packet having a packet length proportional to the PCM length. The COP packet includes a COP header comprising data used by a receiver module to depacketize the COP packet. The COP packet further includes a subframe including the encoded audio frame. The subframe also includes a frame length field that indicates a length of the encoded audio frame. The COP packet further includes a zero padding block including a zero padding length field that indicates a number of zero bytes in a zero padding field. The zero padding field includes the number of zero bytes. The method further includes providing the COP packet to the receiver module over a PCM interface.

In another aspect, a COP packetizing circuit is provided. The COP packetizing circuit comprises a means for receiving an encoded audio frame generated from a PCM frame having a PCM length. The COP packetizing circuit further comprises a means for generating a COP packet having a packet length proportional to the PCM length. The COP packet comprises a COP header comprising data used by a receiver module to depacketize the COP packet. The COP packet also comprises a subframe including the encoded audio frame. The subframe also comprises a frame length field that indicates a length of the encoded audio frame. The COP packet further comprises a zero padding block that comprises a zero padding length field that indicates a number of zero bytes in a zero padding field. The zero padding field comprises the number of zero bytes. The COP packetizing circuit further comprises a means for providing the COP packet to the receiver module over a PCM interface.

In another aspect, a circuit comprising a receiver module is provided. The circuit is configured to receive a COP packet having a COP packet length. The COP packet comprises a COP header comprising data used by a receiver module to depacketize the COP packet. The COP packet also comprises a subframe comprising an encoded audio frame, and a frame length field that indicates a length of the encoded audio frame. The COP packet also comprises a zero padding block that comprises a zero padding length field that indicates a number of zero bytes in a zero padding field. The zero padding field comprises the number of zero bytes. The circuit is further configured to depacketize the COP packet into the encoded audio frame, and provide the encoded audio frame to an audio device configured to use the encoded audio frame for audio playback.

In another aspect, an audio system is provided. The audio system comprises a circuit that is configured to receive a PCM frame having PCM length, generate an encoded audio frame from the PCM frame, and provide the encoded audio frame. The audio system further comprises a COP packetizing circuit configured to receive the encoded audio frame, and generate a COP packet having a packet length proportional to the PCM length. The COP packet comprises a COP header comprising data used by a receiver module to depacketize the COP packet, and a subframe comprising the encoded audio frame. The subframe also comprises a frame length field that indicates a length of the encoded audio frame. The COP packet further comprises a zero padding block that comprises a zero padding length field that indicates a number of zero bytes in a zero padding field. The zero padding field comprises the number of zero bytes. The COP packetizing circuit is also configured to provide the COP packet to the receiver module over a PCM interface. The audio system further comprises a circuit comprising the receiver module. The circuit is configured to receive the COP packet, depacketize the COP packet into the encoded audio frame, and provide the encoded audio frame to an audio device configured to use the encoded audio frame for audio playback. The audio system further comprises an audio device configured to receive the encoded audio frame.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include packetizing encoded audio frames into compressed-over-pulse code modulation (PCM) (COP) packets for transmission over PCM interfaces. In one aspect, a COP packetizing circuit is configured to receive an encoded (e.g., compressed) audio frame generated from a PCM frame. The COP packetizing circuit generates a COP packet that includes the encoded audio frame irrespective of the format of the encoded audio frame. The COP packet is generated with a packet length proportional to a PCM length of the PCM frame, which allows the COP packetizing circuit to transmit the COP packet over an isochronous PCM interface with a lower bit rate than the PCM frame to reduce power. Thus, the COP packetizing circuit provides a mobile computing device with a single packetizing scheme that supports multiple audio formats, and also allows for reducing power through bit rate scaling.

Figure 1:
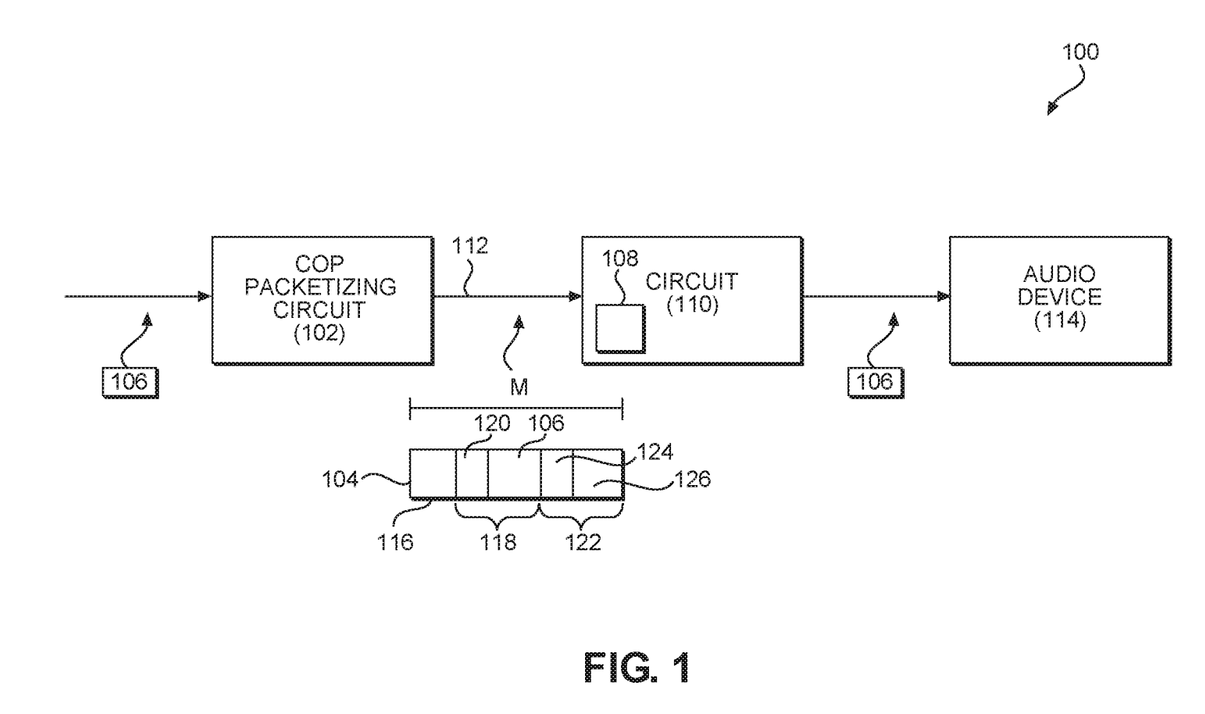
FIG. 1 is a block diagram of an exemplary audio system that includes a compressed-over-pulse code modulation (PCM) (COP) packetizing circuit configured to generate COP packets from encoded audio frames, and provide the COP packets over a PCM interface to a receiver module.

In this regard, FIG. 1 illustrates an exemplary audio system 100 that includes a COP packetizing circuit 102 configured to generate a COP packet 104 from an encoded audio frame 106. Following packetization, the COP packetizing circuit 102 is configured to provide the COP packet 104 to a receiver module 108 employed by a circuit 110 over a PCM interface 112. In this aspect, the receiver module 108 is configured to depacketize the COP packet 104 into the encoded audio frame 106 to be provided to an audio device 114. As a non-limiting example, the audio device 114 may be configured to decode the encoded audio frame 106 for audio playback of the corresponding audio data. In this example, the audio device 114 may receive specific decode-related information from the circuit 110 in addition to receiving the encoded audio frame 106. Alternatively, other aspects not illustrated herein may configure the receiver module 108 to decode the depacketized encoded audio frame 106 into decoded audio packets that are transmitted to the audio device 114 for audio playback, such as via a dongle. Other non-illustrated aspects may also configure the receiver module 108 to depacketize the COP packet 104 into the encoded audio frame 106, and transmit the encoded audio frame 106 to the audio device 114 packaged in another packet format compatible with the audio device 114.

With continuing reference to FIG. 1, the COP packetizing circuit 102 is configured to receive the encoded audio frame 106 based on a PCM frame (not shown). In other words, the encoded audio frame 106 is encoded (e.g., compressed) audio data of the PCM frame. The COP packetizing circuit 102 is configured to generate the COP packet 104 with a packet length M proportional to a PCM length L of the PCM frame. As discussed in greater detail below, the packet length M depends on whether the PCM length L is greater than or less than one (1) millisecond (ms). Additionally, as described in more detail below, the COP packet 104 includes a COP header 116 that contains data used by the receiver module 108 to depacketize the COP packet 104. The COP packet 104 also has a subframe 118 that includes the encoded audio frame 106, as well as a frame length field 120 that indicates a length of the encoded audio frame 106. Further, the COP packet 104 employs a zero padding block 122 that includes a zero padding length field 124 that indicates a number of zero bytes in a zero padding field 126. The zero padding field 126 can be sized according to the number of zero bytes needed to generate the COP packet 104 with the packet length M. Additionally, although not included in this aspect, the COP packet 104 may also include alignment bits, if needed.

With continuing reference to FIG. 1, generating the COP packet 104 in this manner allows the COP packetizing circuit 102 to generate the COP packet 104 irrespective of the format of the encoded audio frame 106. In other words, the packetizing scheme of the COP packetizing circuit 102 is agnostic to the format of the encoded audio frame 106. For example, the COP packetizing circuit 102 can generate the COP packet 104 using the encoded audio frame 106 in various formats, such as, but not limited to, the Bluetooth™ formats of Low Complexity Subband Coding (SBC), digital audio data reduction technology (aptX), aptX-High Definition (aptX-HD), and advanced audio coding (AAC). If the COP packet 104 is generated using the encoded audio frame 106 having one of the above noted formats, then the audio device 114 may be a Bluetooth™ device configured to decode the encoded audio frame 106 for audio playback.

With continuing reference to FIG. 1, the COP packetizing circuit 102 can transmit the COP packet 104 over the PCM interface 112 employed using various isochronous protocols. As non-limiting examples, the PCM interface 112 may be employed using High-Definition Multi-media Interface (HDMI), Sony/Philips Digital Interface Format (S/PDIF) interface, SLIMBus interface, or any interface defined under the International Electrotechnical Commission (IEC) 61937 international standard. Further, generating the COP packet 104 with the packet length M allows the COP packetizing circuit 102 to transmit the COP packet 104 with a lower bit rate than that of the PCM frame to reduce power. As a non-limiting example, if an encoder (not shown) needs 1,024 PCM samples to produce the encoded audio frame 106, then the COP packetizing circuit 102 also produces 1,024 samples, but possibly with a different number of channels or sampling rate compared to the PCM frame (e.g., fewer channels or a lower sampling rate). For instance, if the PCM frame corresponds to a stereo audio stream, the COP packet 104 can be transmitted as a mono-audio stream. Additionally, if the PCM frame has a sampling rate of forty-eight (48) kilohertz (kHz), the COP packet 104 can have a sampling rate of thirty-two (32) kHz, for example. Thus, the COP packetizing circuit 102 provides a mobile computing device with a single packetizing scheme that supports multiple audio formats, while also allowing for reduced power consumption via bit rate scaling.

Figure 2:
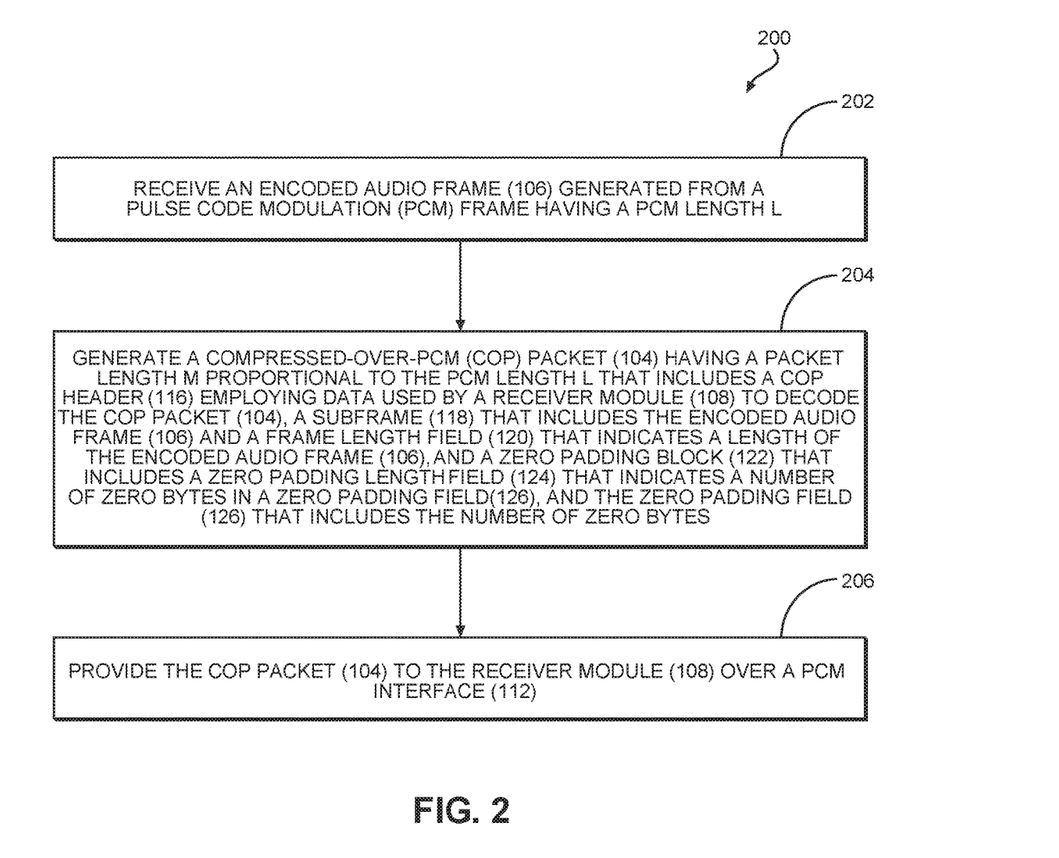
FIG. 2 is a flowchart illustrating an exemplary process employed by the COP packetizing circuit of FIG. 1 for packetizing an encoded audio frame into a COP packet.

FIG. 2 illustrates an exemplary process 200 employed by the COP packetizing circuit 102 of FIG. 1 for packetizing the encoded audio frame 106 into the COP packet 104. The process 200 includes receiving the encoded audio frame 106 generated from the PCM frame having the PCM length L (block 202). The process 200 also includes generating the COP packet 104 having the packet length M proportional to the PCM length L. As previously described, the COP packet 104 includes the COP header 116 employing data used by the receiver module 108, the subframe 118 that includes the encoded audio frame 106 and the frame length field 120, and the zero padding block 122 that includes the zero padding length field 124 and the zero padding field 126 (block 204). The process 200 further includes providing the COP packet 104 to the receiver module 108 over the PCM interface 112 (block 206).

The COP packetizing circuit 102 in aspects described herein is configured to operate in two (2) different modes depending on the PCM length L (e.g., bit length) of the PCM frame from which the encoded audio frame 106 is generated. More specifically, the COP packetizing circuit 102 is configured to operate in a first mode if the PCM length L of the PCM frame is greater than or equal to one (1) millisecond (ms), and a second mode if the PCM length L of the PCM frame is less than one (1) ms. As used herein, the PCM length L of the PCM frame described temporally (e.g., greater than or equal to or less than one (1) ms) refers to the real-time audio playback duration of the corresponding audio data. For example, approximately 192 bytes may be equivalent to one (1) ms of real-time audio playback such that a PCM length L of less than 192 bytes has a real-time audio playback duration of less than one (1) ms. In this example, if a PCM frame includes 512 bytes for encoding sixteen (16) bit audio data at a 48 Hertz (Hz) sampling rate, then the PCM length L corresponds to 2.67 ms.

Note that while 1 ms has been selected as the threshold between the two modes, other values may be chosen as needed or desired.

Figure 3:
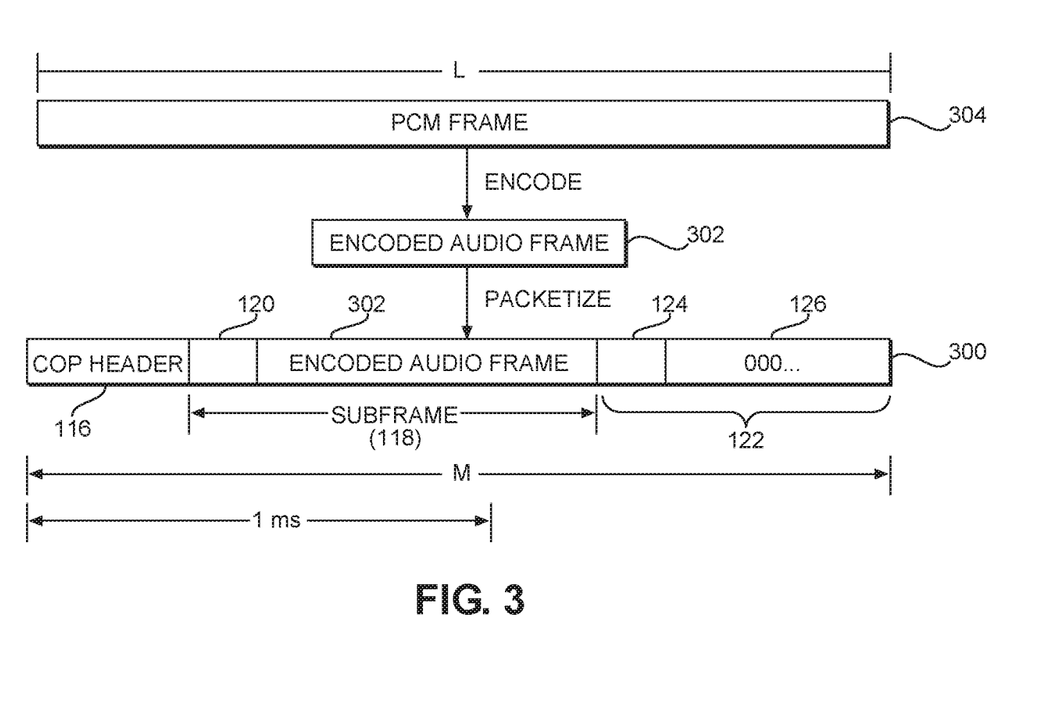
FIG. 3 is a diagram of an exemplary COP packet generated by the COP packetizing circuit of FIG. 1 using a single encoded audio frame generated from a PCM frame.

In aspects described herein, the packet length M is equal to the PCM length L if the PCM length L is greater than or equal to one (1) ms. Alternatively, if the PCM length L is less than one (1) ms, the packet length M is calculated according to the equation (PCM length L×n), where n is the smallest positive integer that causes M=(PCM length L×n) to be greater than or equal to one (1) ms. In this regard, FIG. 3 illustrates an exemplary COP packet 300 generated by the COP packetizing circuit 102 of FIG. 1 using a single encoded audio frame 302 generated from a PCM frame 304 having a PCM length L that is greater than one (1) ms. In other words, the PCM length L (e.g., bit length) has a corresponding real-time audio playback duration of greater than or equal to one (1) ms. In this example, because the PCM frame 304 has the PCM length L that is greater than or equal to one (1) ms, the COP packetizing circuit 102 is configured to generate the COP packet 300 with the packet length M equal to the PCM length L. The COP packet 300 includes the COP header 116, the subframe 118 that includes the frame length field 120 and the encoded audio frame 302, and the zero padding block 122 that includes the zero padding length field 124 and the zero padding field 126.

Figure 4:
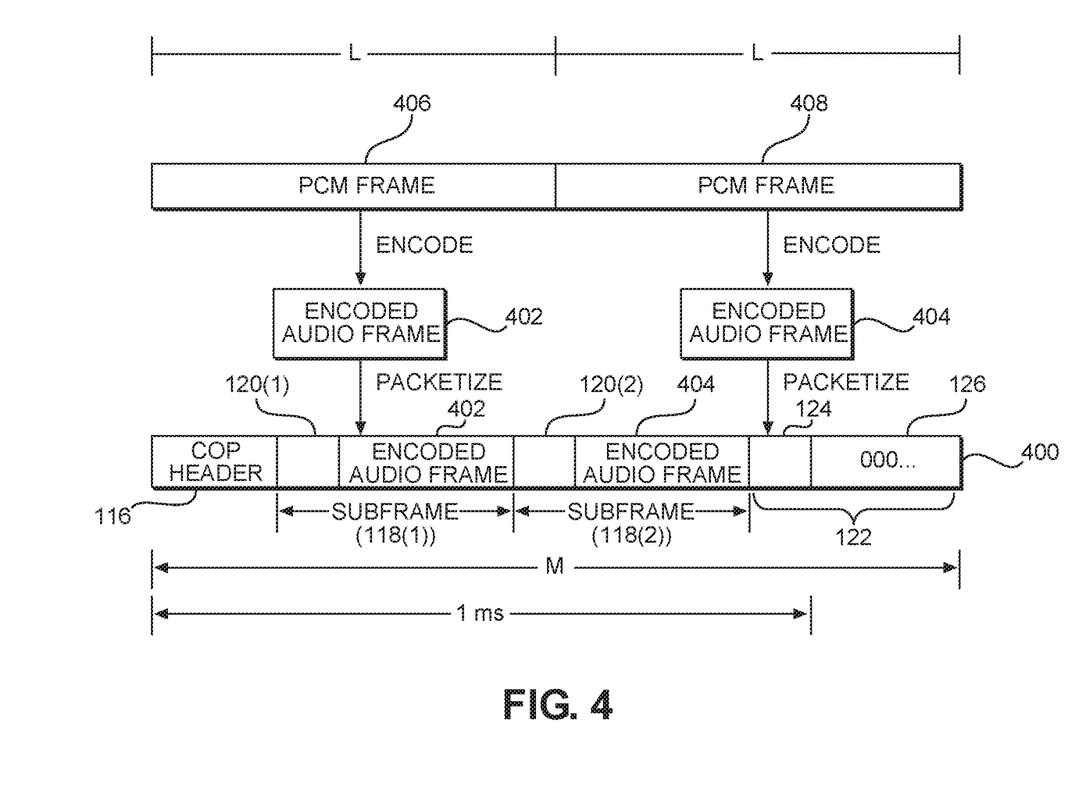
FIG. 4 is a diagram of an exemplary COP packet generated by the COP packetizing circuit of FIG. 1 using two (2) encoded audio frames generated from PCM frames.

FIG. 4 illustrates an exemplary COP packet 400 generated by the COP packetizing circuit 102 of FIG. 1 using a plurality of encoded audio frames 402, 404 generated from a plurality of PCM frames 406, 408, respectively, each having a PCM length L less than one (1) ms. In other words, the respective PCM length L (e.g., bit length) of each PCM frame 406, 408 has a corresponding real-time audio playback duration of less than one (1) ms. In this example, in response to each of the PCM frames 406, 408 having the PCM length L that is less than one (1) ms, the COP packetizing circuit 102 is configured to generate the COP packet 400 with the packet length M greater than or equal to one (1) ms using the above noted equation M=(PCM length L×n), where n can be any integer greater than or equal to one (1). The two (2) encoded audio frames 402, 404 together are greater than or equal to one (1) ms, resulting in n having a value of two (2) in this example. In this manner, the COP packet 400 includes both encoded audio frames 402, 404 such that the packet length M=(PCM length L×2). The COP packet 400 includes the COP header 116, a subframe 118(1) that includes a frame length field 120(1) and the encoded audio frame 402, a subframe 118(2) that includes a frame length field 120(2) and the encoded audio frame 404, and the zero padding block 122 that includes the zero padding length field 124 and the zero padding field 126. Generating the COP packet 400 in response to each of the PCM frames 406, 408 having the PCM length L that is less than one (1) ms limits overhead by packetizing the two (2) encoded audio frames 402, 404 with only one (1) COP header 116, as opposed to generating a separate COP packet having a separate header for each encoded audio frame 402, 404.

Figure 5:
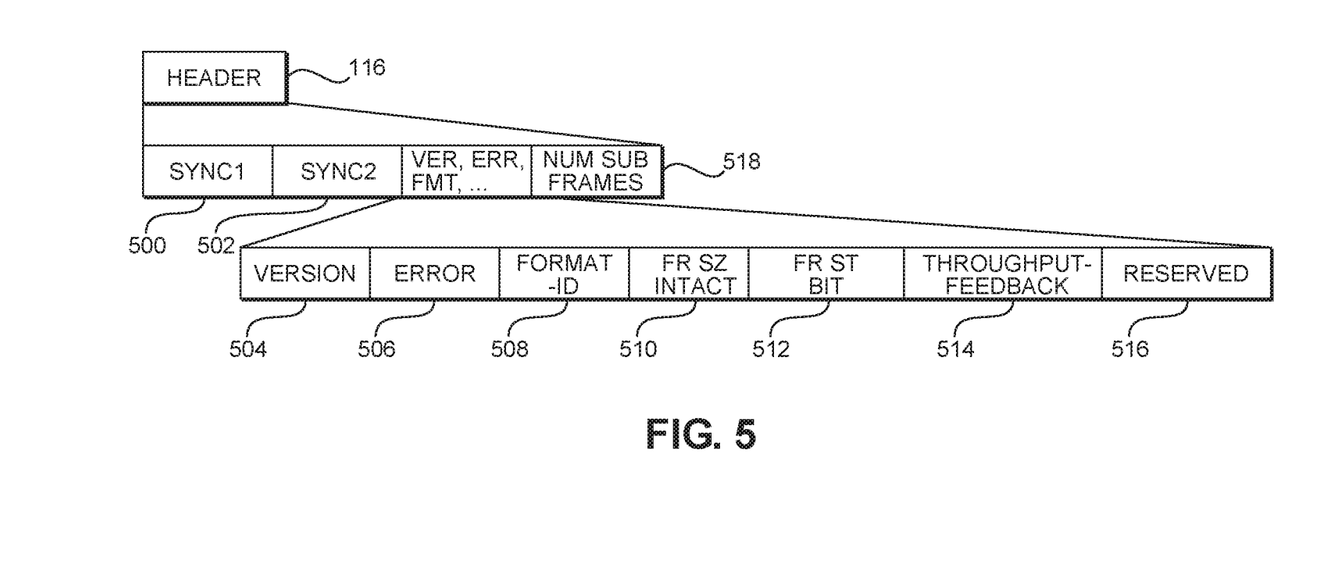
FIG. 5 is a diagram of an exemplary COP header of a COP packet generated by the COP packetizing circuit of FIG. 1.

FIG. 5 illustrates an exemplary COP header 116 of the COP packet 104 generated by the COP packetizing circuit 102 of FIG. 1. In this example, the data of the COP header 116 includes a first sync word 500 and a second sync word 502, each of which includes sixteen (16) bits. The first and second sync words 500, 502 serve to notify the receiver module 108 of FIG. 1 of a start of a new COP packet 104. In other words, a bit pattern of the first and second sync words 500, 502 indicates to the receiver module 108 that the data following the first and second sync words 500, 502 is the COP packet 104 to be depacketized. The data of the COP header 116 also includes a version field 504 that includes two (2) bits that indicate the version of the COP packet 104 format. For example, the COP packet 104 may be generated with varying formats that each includes different fields in the COP header 116 based on the version of the COP packetization scheme. In this manner, the version field 504 indicates to the receiver module 108 the version of the COP packet 104 to assist in depacketizing. Further, the data of the COP header 116 includes an error bit 506 that indicates if there are any errors present in the COP packet 104. The data of the COP header 116 also includes an audio format field 508 that includes six (6) bits used to indicate an audio format of the encoded audio frame 106 of FIG. 1. For example, the audio format field 508 can indicate if the encoded audio frame 106 is an idle frame, an SBC frame, an aptX frame, an aptX-HD frame, an AAC frame, or an unknown format. It is worth noting that the audio format field 508 is not mandatory, as the audio format field 508 does not dictate the behavior of the COP packetizing circuit 102 or how the receiver module 108 depacketizes the COP packet 104. Rather, the audio format field 508 may be useful for debugging and launching an appropriate decoder following depacketization by the receiver module 108.

With continuing reference to FIG. 5, the data of the COP header 116 also includes a frame intact bit 510. As described in more detail below, the frame intact bit 510 is configured to be set to a first value to indicate that there is no clock skew between the COP packet 104 and the PCM frame. The frame intact bit 510 is further configured to be set to a second value to indicate that there is clock skew between the COP packet 104 and the PMC packet. The data of the COP header 116 also includes a frame storage bit 512 that indicates whether the frame length field 120 represents bits or bytes. The data of the COP header 116 also includes a throughput-feedback field 514 for controlling a bit rate at which the circuit 110 is to provide encoded audio frames encapsulated in feedback-generated COP packets. As described in more detail below, the throughput-feedback field 514 includes two (2) bits and is configured to be set to indicate that the bit rate of encoded audio frames sent from the circuit 110 in feedback-generated COP packets should equal one of a default rate (bits 00), a low rate (bits 01), a medium rate (bits 10), or a high rate (bits 11). The COP header 116 also includes three (3) reserved bits 516 for future use, which are set to zero (0) by default. Additionally, the COP header 116 includes a subframe number field 518 that indicates the number of subframes 118 included in the COP packet 104.

Figure 6:
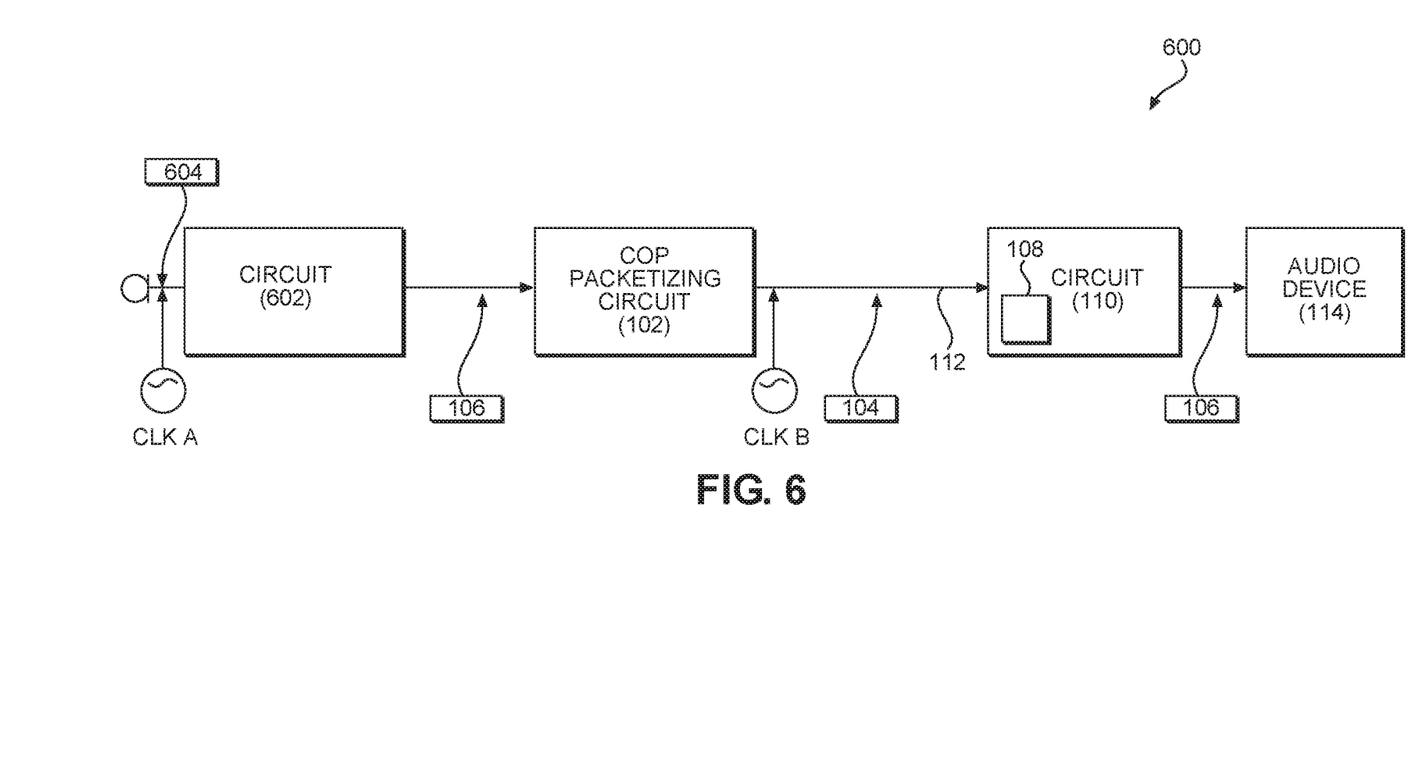
FIG. 6 is block diagram of an exemplary audio system that includes the COP packetizing circuit of FIG. 1 configured to generate COP packets that account for clock skew.

As noted above, the COP header 116 includes the frame intact bit 510 that indicates whether there is clock skew between the COP packet 104 and the PCM frame. In this regard, FIG. 6 illustrates an exemplary audio system 600 that includes the COP packetizing circuit 102 of FIG. 1 configured to generate the COP packet 104 that accounts for clock skew. In this example, the COP packetizing circuit 102 receives the encoded audio frame 106 from a circuit 602 that generates the encoded audio frame 106 based on a PCM frame 604 recorded according to a first clock CLK A operating at a first frequency. The COP packetizing circuit 102 generates the COP packet 104 as described above. Further, the COP packetizing circuit 102 provides the COP packet 104 to the receiver module 108 over the PCM interface 112 according to a second clock CLK B operating at a second frequency, possibly different from the first frequency. In this aspect, the receiver module 108 depacketizes the COP packet 104 into the encoded audio frame 106 and provides the encoded audio frame 106 to the audio device 114. However, audio data within the COP packet 104 may be skewed with respect to the second clock CLK B because it was first recorded with the first clock CLK A, but transmitted using the second clock CLK B. To prevent buffer underflows and overflows in the receiver module 108 caused by the clock skew, the receiver module 108 corrects the clock skew based on the frame intact bit 510.

In this regard, with continuing reference to FIG. 6, to notify the receiver module 108 that the COP packet 104 does not suffer from clock skew, the COP packetizing circuit 102 is configured to set the frame intact bit 510 of FIG. 5 to an active value in response to the COP packetizing circuit 102 detecting that a previous COP packet 104 has the same packet length M as the PCM frame 604. Alternatively, the COP packetizing circuit 102 is configured to set the frame intact bit 510 to an inactive value 1) in response to the COP packetizing circuit 102 being unable to determine if the COP packet 104 has the same packet length M as the PCM frame 604 (e.g., PCM length L), 2) in response to the COP packetizing circuit 102 changing the packet length M of the COP packet 104 to indicate clock skew, or 3) in an instance in which the implementation does not support clock skew recovery.

With continuing reference to FIG. 6, in response to the COP packetizing circuit 102 determining that the first and second clocks CLK A, CLK B are skewed relative to one another, the COP packetizing circuit 102 alters the amount of zeros in the zero padding field 126 to mitigate the effects of clock skew. For example, if the first frequency of the first clock CLK A is lower than the second frequency of the second clock CLK B, then zeros are added to the zero padding field 126. Alternatively, zeros are removed from the zero padding field 126 if the first frequency of the first clock CLK A is higher than the second frequency of the second clock CLK B. Further, the receiver module 108 tracks the frame intact bit 510 and the length between an instance of the second sync word 502 and a subsequent instance of the first sync word 500, wherein this length is considered the COP packet length. In response to the frame intact bit 510 having an active value, thus indicating no clock skew, the receiver module 108 uses the COP packet length of the previously received COP packet 104 as a nominal packet length M to depacketize the COP packet 104. However, in response to the frame intact bit 510 having an inactive value, thus indicating clock skew, the receiver module 108 calculates the clock skew (e.g., drift) as the difference between the packet length M of the current COP packet 104 and the COP packet length of the previous COP packet 104, and adjusts the depacketizing scheme accordingly. In this manner, the COP packetizing circuit 102 can generate the COP packet 104 such that the receiver module 108 can detect and mitigate the effects of clock skew.

Figure 7:
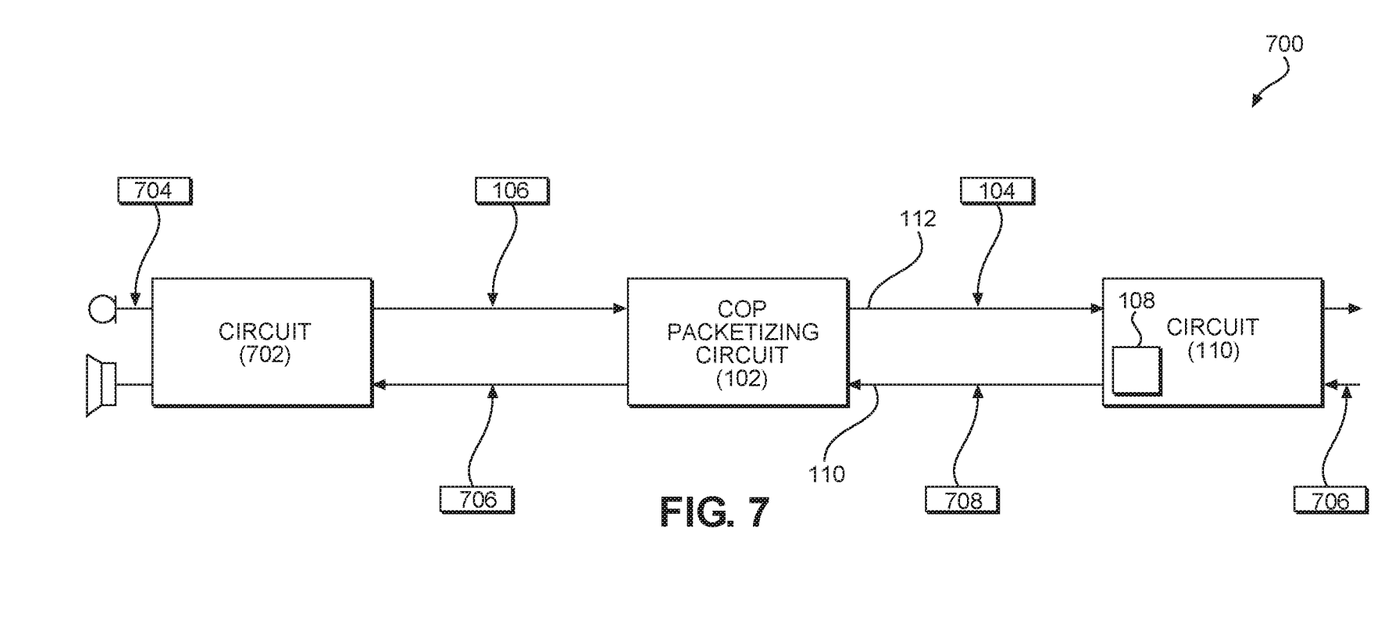
FIG. 7 is a block diagram of an exemplary audio system that includes the COP packetizing circuit of FIG. 1 configured to generate COP packets that indicate a bit rate for a circuit to provide encoded audio frames encapsulated in feedback-generated COP packets.

As noted above, the data of the COP header 116 includes the throughput-feedback field 514 for controlling a bit rate at which the circuit 110 is to provide encoded audio frames encapsulated in feedback-generated COP packets, which is separate from the bit rate of the COP packet 104. In this regard, FIG. 7 illustrates an exemplary audio system 700 that includes the COP packetizing circuit 102 of FIG. 1 configured to generate the COP packet 104 that indicates the bit rate at which the circuit 110 is to provide encoded audio frames encapsulated in feedback-generated COP packets. For example, a circuit 702 receives a PCM frame 704 and generates the corresponding encoded audio frame 106. The COP packetizing circuit 102 receives the encoded audio frame 106 and generates the COP packet 104 at a certain bit rate over the PCM interface 112, as previously described. Further, in this example, audio data transmission is bidirectional such that the circuit 110 also receives an encoded audio frame 706, and provides a corresponding feedback-generated COP packet 708 to the COP packetizing circuit 102. In this manner, the COP packetizing circuit 102 depacketizes the feedback-generated COP packet 708, and provides the encoded audio frame 706 to the circuit 702. Similar to the description of the receiver module 108 with reference to FIG. 1, other aspects of the COP packetizing circuit 102 may decode the encoded audio frame 706 and provide the decoded audio data to the circuit 702, or repackage the encoded audio frame 706 into a new format to provide to the circuit 702.

With continuing reference to FIG. 7, the circuit 702 is capable of handling data (e.g., the encoded audio frame 706) at a bit rate that can change dynamically. Thus, the circuit 702 is configured to notify the COP packetizing circuit 102 of a desired bit rate (e.g., throughput) at which the circuit 110 should provide the encoded audio frame 706 encapsulated in the feedback-generated COP packet 708. The COP packetizing circuit 102 encapsulates the desired bit rate information in the COP packet 104 that is provided to the circuit 110, such that the circuit 110 generates the feedback-generated COP packet 708 that includes the encoded audio frame 706 with the desired bit rate. In this manner, the throughput-feedback field 514 enables the COP packetizing circuit 102 to control the bit rate (e.g., throughput) of data received from the circuit 110 such that the COP packetizing circuit 102 can provide the encoded audio frame 706 to the circuit 702 at the desired bit rate.

The elements described herein are sometimes referred to as means for achieving a particular property. In this regard, the COP packetizing circuit 102 is sometimes referred to herein as "a means for receiving an encoded audio frame generated from a PCM frame having a PCM length." Additionally, the COP packetizing circuit 102 is sometimes referred to herein as "a means for generating a COP packet having a packet length proportional to the PCM length." The COP packetizing circuit 102 is also sometimes referred to herein as "a means for providing the COP packet to the receiver module over a PCM interface."

Packetizing encoded audio frames into COP packets for transmission over PCM interfaces according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 8:
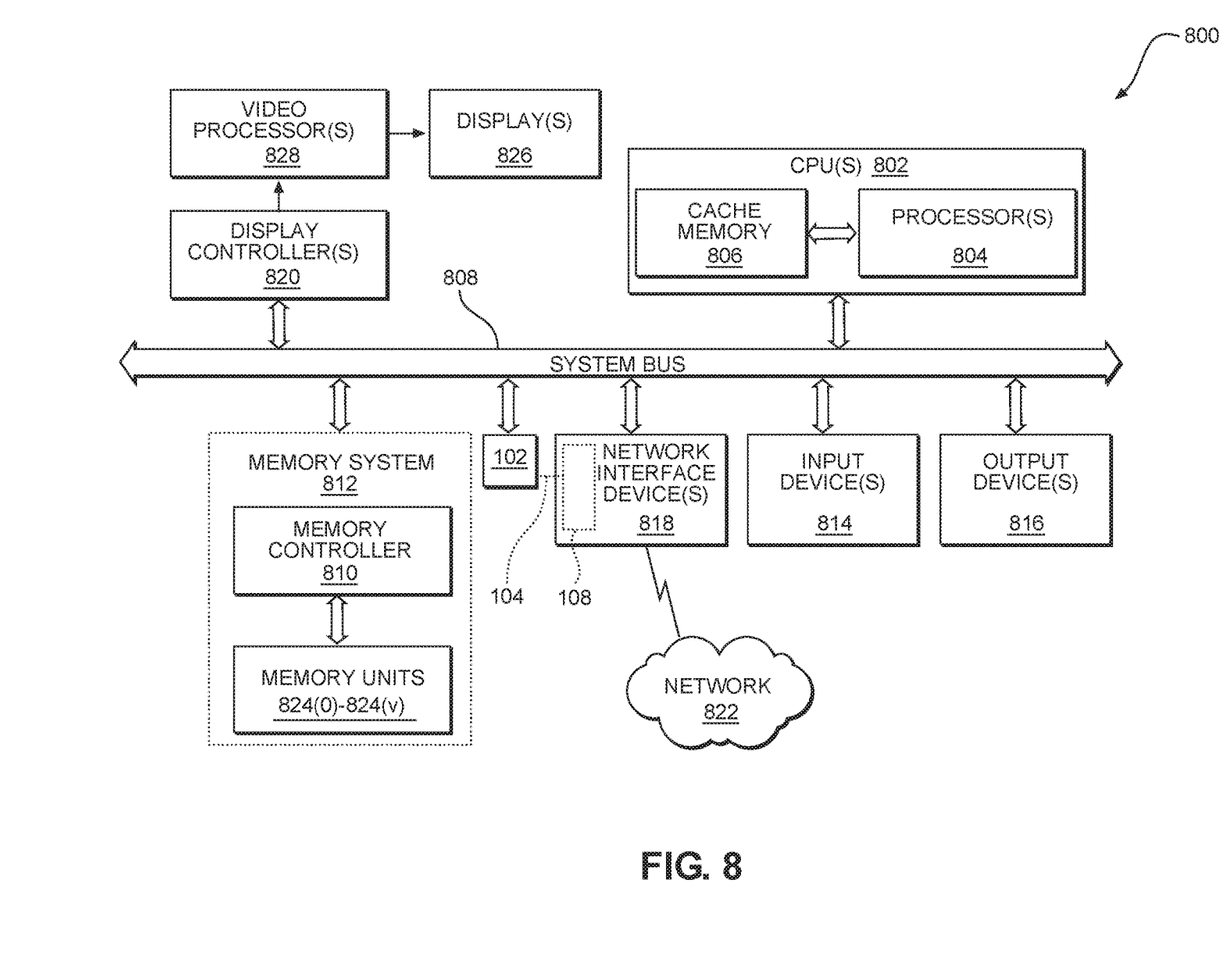
FIG. 8 is a block diagram of an exemplary processor-based system that can include the COP packetizing circuit of FIG. 1.

In this regard, FIG. 8 illustrates an example of a processor-based system 800 that can employ the COP packetizing circuit 102 illustrated in FIG. 1. In this example, the processor-based system 800 includes one or more central processing units (CPUs) 802, each including one or more processors 804. The CPU(s) 802 may have cache memory 806 coupled to the processor(s) 804 for rapid access to temporarily stored data. The CPU(s) 802 is coupled to a system bus 808 and can intercouple master and slave devices included in the processor-based system 800. As is well known, the CPU(s) 802 communicates with these other devices by exchanging address, control, and data information over the system bus 808. For example, the CPU(s) 802 can communicate bus transaction requests to a memory controller 810 as an example of a slave device. Although not illustrated in FIG. 8, multiple system buses 808 could be provided, wherein each system bus 808 constitutes a different fabric.

Other master and slave devices can be connected to the system bus 808. As illustrated in FIG. 8, these devices can include a memory system 812, one or more input devices 814, one or more output devices 816, one or more network interface devices 818, and one or more display controllers 820, as examples. The input device(s) 814 can include any type of input device, including, but not limited to, input keys, switches, voice processors, etc. The output device(s) 816 can include any type of output device, including, but not limited to, audio, video, other visual indicators, etc. The network interface device(s) 818 can be any device configured to allow exchange of data to and from a network 822. For example, the network interface device(s) 818 can employ the receiver module 108 configured to receive the COP packet 104 from the COP packetizing circuit 102, and transmit depacketized audio data to the network 822. The network 822 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 818 can be configured to support any type of communications protocol desired. The memory system 812 can include one or more memory units 824(0)-824(N).

The CPU(s) 802 may also be configured to access the display controller(s) 820 over the system bus 808 to control information sent to one or more displays 826. The display controller(s) 820 sends information to the display(s) 826 to be displayed via one or more video processors 828, which process the information to be displayed into a format suitable for the display(s) 826. The display(s) 826 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for packetizing an encoded audio frame based on a pulse code modulation (PCM) frame into a compressed-over-PCM (COP) packet, comprising:
   receiving the encoded audio frame generated from the PCM frame having a PCM length;
   generating the COP packet having a packet length proportional to the PCM length and comprising:
     a COP header comprising data used by a receiver module to depacketize the COP packet, wherein the data comprises a frame intact bit configured to be set to: a first value in response to detecting that there is no clock skew between the COP packet and the PCM frame, and a second value in response to detecting that there is clock skew between the COP packet and the PCM frame;
     a subframe, comprising:
       the encoded audio frame; and
       a frame length field that indicates a length of the encoded audio frame; and
     a zero padding block, comprising:
       a zero padding length field that indicates a number of zero bytes in a zero padding field;
       the zero padding field comprising the number of zero bytes; and
   providing the COP packet to the receiver module over a PCM interface.

2. The method of claim 1, wherein generating the COP packet further comprises generating the COP packet comprising the encoded audio frame in response to the PCM frame having the PCM length with a corresponding real-time audio playback duration of greater than or equal to one (1) millisecond (ms).

3. The method of claim 1, further comprising:
   receiving a plurality of encoded audio frames based on a plurality of PCM frames;
   wherein generating the COP packet further comprises generating the COP packet comprising the plurality of encoded audio frames in response to each of the plurality of PCM frames having a PCM length with a corresponding real-time audio playback duration of less than one (1) millisecond (ms).

4. The method of claim 1, further comprising increasing the number of zero bytes of the zero padding field in response to the frame intact bit being set to the second value indicating that there is clock skew, wherein a first frequency of a first clock used to record the PCM frame is lower than a second frequency of a second clock used to provide the COP packet over the PCM interface.

5. The method of claim 1, further comprising decreasing the number of zero bytes of the zero padding field in response to the frame intact bit being set to the second value indicating that there is clock skew, wherein a first frequency of a first clock used to record the PCM frame is higher than a second frequency of a second clock used to provide the COP packet over the PCM interface.

6. The method of claim 1, wherein generating the COP packet further comprises generating the COP packet wherein the data further comprises a throughput-feedback field for controlling a bit rate at which a circuit is to provide encoded audio frames encapsulated in feedback-generated COP packets.

7. The method of claim 6, wherein the throughput-feedback field comprises two (2) bits set to indicate that the bit rate equals one of a default rate, a low rate, a medium rate, and a high rate.

8. The method of claim 1, wherein generating the COP packet further comprises generating the COP packet wherein the data further comprises:
   a first sync word comprising sixteen (16) bits;
   a second sync word comprising 16 bits;
   a version field comprising two (2) bits;
   an error bit that indicates if errors are present in the COP packet;
   an audio format field comprising six (6) bits that indicate an audio format of the encoded audio frame;
   a frame storage bit that indicates whether the frame length field represents bits or bytes; and
   a subframe number field that indicates a number of subframes included in the COP packet.

9. A method performed at a circuit comprising a receiver module, comprising:
   receiving a compressed-over-pulse code modulation (PCM) (COP) packet having a COP packet length, wherein the COP packet comprises:
      a COP header comprising data used by the receiver module to depacketize the COP packet, wherein the data comprises a frame intact bit configured to be set to:
         a first value to indicate that there is no clock skew between the COP packet and a PCM frame used to generate an encoded audio frame in the COP packet; and
         a second value to indicate that there is clock skew between the COP packet and the PCM frame;
      a subframe, comprising:
         the encoded audio frame; and
         a frame length field that indicates a length of the encoded audio frame; and
      a zero padding block, comprising:
         a zero padding length field that indicates a number of zero bytes in a zero padding field;
         the zero padding field comprising the number of zero bytes;
   depacketizing the COP packet into the encoded audio frame; and
   providing the encoded audio frame to an audio device configured to use the encoded audio frame for audio playback.

10. The method of claim 9,
further comprising:
   responsive to the frame intact bit having the first value, depacketizing the COP packet into the encoded audio frame based on a COP packet length of a previously received COP packet; and
   responsive to the frame intact bit having the second value, depacketizing the COP packet into the encoded audio frame based on a clock skew calculated by subtracting the COP packet length of the previously received COP packet from the COP packet length of the COP packet.

11. The method of claim 9, wherein:
the data further comprises a throughput-feedback field for controlling a bit rate at which the circuit is to provide encoded audio frames encapsulated in feedback-generated COP packets;
the method further comprising:
   receiving the encoded audio frame generated from the PCM frame having a PCM length;
   generating a feedback-generated COP packet comprising the encoded audio frame having the bit rate indicated by the throughput-feedback field; and
   providing the feedback-generated COP packet to a corresponding circuit.

12. An audio system, comprising:
a circuit, configured to:
   receive a pulse code modulated (PCM) frame having a PCM length;
   generate an encoded audio frame from the PCM frame; and
   provide the encoded audio frame;
a compressed-over-PCM (COP) packetizing circuit, configured to:
   receive the encoded audio frame;
   generate a COP packet having a packet length proportional to the PCM length and comprising:
      a COP header comprising data used by a receiver module to depacketize the COP packet, wherein the data comprises a frame intact bit configured to be set to:
         a first value to indicate that there is no clock skew between the COP packet and the PCM frame used to generate the encoded audio frame in the COP packet; and
         a second value to indicate that there is clock skew between the COP packet and the PCM frame;
      a subframe, comprising:
         the encoded audio frame; and
         a frame length field that indicates a length of the encoded audio frame; and
      a zero padding block, comprising:
         a zero padding length field that indicates a number of zero bytes in a zero padding field;
         the zero padding field comprising the number of zero bytes; and
   provide the COP packet to the receiver module over a PCM interface;
a circuit comprising the receiver module, configured to:
   receive the COP packet;
   depacketize the COP packet into the encoded audio frame; and
   provide the encoded audio frame to an audio device configured to use the encoded audio frame for audio playback; and
the audio device configured to receive the encoded audio frame.

13. The method of claim 1, further comprising generating the COP packet with a different sampling rate compared to a sampling rate of the PCM frame to reduce power consumption compared to providing the PCM frame over the PCM interface.

14. The method of claim 6, further comprising:
receiving a feedback-generated COP packet from the circuit;
depacketizing the feedback-generated COP packet into an encoded audio frame; and
providing the encoded audio frame to a corresponding circuit.

15. The method of claim 1, wherein the encoded audio frame may have a Bluetooth™ format selected from the group consisting of: Low Complexity Subband Coding (SBC), digital audio data reduction technology (aptX), aptX-High Definition (aptX-HD), and advanced audio coding (AAC).

* * * * *